United States Patent
Kang et al.

(10) Patent No.: US 12,394,816 B2
(45) Date of Patent: Aug. 19, 2025

(54) METHOD FOR MANUFACTURING ELECTRODE LEAD

(71) Applicant: LG Energy Solution, Ltd., Seoul (KR)

(72) Inventors: Min Hyeong Kang, Daejeon (KR); Seong Heon Jeong, Chungcheongbuk-do (KR); Yong Su Choi, Daejeon (KR); Sang Hun Kim, Daejeon (KR); Hyung Kyun Yu, Daejeon (KR); Hyun Tae Kim, Chungcheongbuk-do (KR); Il Gyu Byen, Chungcheongbuk-do (KR); Chung Ki Cho, Chungcheongbuk-do (KR)

(73) Assignee: LG Energy Solution, Ltd., Seoul (KR)

(*) Notice: Subject to any disclaimer, the term of this patent is extended or adjusted under 35 U.S.C. 154(b) by 566 days.

(21) Appl. No.: 17/772,798

(22) PCT Filed: Oct. 27, 2020

(86) PCT No.: PCT/KR2020/014728
§ 371 (c)(1),
(2) Date: Apr. 28, 2022

(87) PCT Pub. No.: WO2021/085977
PCT Pub. Date: May 6, 2021

(65) Prior Publication Data
US 2022/0416289 A1 Dec. 29, 2022

(30) Foreign Application Priority Data
Nov. 1, 2019 (KR) .................. 10-2019-0138806

(51) Int. Cl.
*H01M 10/04* (2006.01)
*H01M 50/566* (2021.01)

(52) U.S. Cl.
CPC ... *H01M 10/0468* (2013.01); *H01M 10/0404* (2013.01); *H01M 50/566* (2021.01); *Y10T 29/49108* (2015.01)

(58) Field of Classification Search
CPC .......... H01M 10/0468; H01M 50/183; H01M 50/533; H01M 50/531
(Continued)

(56) References Cited

U.S. PATENT DOCUMENTS 4,157,932 A  6/1979 Hirata
2008/0102362 A1  5/2008 Nii et al.
(Continued)

FOREIGN PATENT DOCUMENTS

CN  102762682 A  10/2012
CN  108695180 A  10/2018
(Continued)

OTHER PUBLICATIONS

Extended European Search Report for Application No. 20883655.1 dated May 10, 2023. 7 pgs.
(Continued)

*Primary Examiner* — Thiem D Phan
(74) *Attorney, Agent, or Firm* — Lerner David LLP

(57) ABSTRACT

To solve the above problem, a method for manufacturing an electrode lead according to an embodiment of the present invention includes: a step of manufacturing each of a first electrode lead and a second electrode lead by cutting a metal plate; a step of applying an adhesive to at least one of one end of the first electrode lead or the other end of the second electrode lead; a step of forming a lead stack by bonding the one end of the first electrode lead and the other end of the second electrode lead to each other; a step of placing the lead stack on a die; and a step of applying heat and pressure to a connection portion of the lead stack, in which the first
(Continued)

electrode lead and the second electrode lead are connected to each other, by using a pressing device.

14 Claims, 9 Drawing Sheets

(58) Field of Classification Search
USPC .............. 29/623.1, 623.2, 623.4, 623.5, 874
See application file for complete search history.

(56) References Cited

U.S. PATENT DOCUMENTS

| | | | |
|---|---|---|---|
| 2012/0321911 A1* | 12/2012 | Watanabe | H01M 4/505 429/188 |
| 2013/0020022 A1 | 1/2013 | Keite-Telgenbuscher et al. | |
| 2017/0125786 A1 | 5/2017 | Park et al. | |
| 2019/0379032 A1 | 12/2019 | Park et al. | |
| 2020/0127246 A1 | 4/2020 | Choi et al. | |
| 2020/0212416 A1 | 7/2020 | Kim et al. | |
| 2020/0295315 A1 | 9/2020 | Kim et al. | |

FOREIGN PATENT DOCUMENTS

| | | | |
|---|---|---|---|
| CN | 110226254 A | 9/2019 | |
| JP | 2008108584 A | 5/2008 | |
| JP | 4354028 | * 10/2009 | ............ Y02E 60/10 |
| JP | 2010073847 A | 4/2010 | |
| JP | 2010218766 A | 9/2010 | |
| JP | 2011076861 A | 4/2011 | |
| JP | 2018-174307 A | 11/2018 | |
| KR | 20140141262 A | 12/2014 | |
| KR | 101508547 B1 | 4/2015 | |
| KR | 20160143979 A | 12/2016 | |
| KR | 101734703 B1 | 5/2017 | |
| KR | 20170071253 A | 6/2017 | |
| KR | 20180106499 A | 10/2018 | |
| KR | 20190023539 A | 3/2019 | |
| KR | 20190059677 A | 5/2019 | |
| KR | 20190060244 A | 6/2019 | |
| WO | 2019-103357 A1 | 5/2019 | |
| WO | 2019-103372 A1 | 5/2019 | |

OTHER PUBLICATIONS

International Search Report for PCT/KR2020/014728 dated Feb. 10, 2021. 3 pgs.

* cited by examiner

METHOD FOR MANUFACTURING ELECTRODE LEAD

CROSS-REFERENCE TO RELATED APPLICATION

The present application is a national phase entry under 35 U.S.C. § 371 of International Application No. PCT/KR2020/014728, filed on Oct. 27, 2020, published in Korean, which claims priority to Korean Patent Application No. 10-2019-0138806, filed on Nov. 1, 2019, the entire contents of which are hereby incorporated herein by reference.

TECHNICAL FIELD

The present invention relates to a method for manufacturing an electrode lead, and a pressing device, and more specifically, to: a method for manufacturing an electrode lead, by which a two-stepped electrode lead is formed to discharge gas generated inside a battery case to the outside, thereby capable of ensuring safety, and by which the two-stepped electrode lead may be rapidly and easily manufactured; and a pressing device which is used in a process of manufacturing the two-stepped electrode lead.

BACKGROUND ART

Generally, secondary batteries include nickel cadmium batteries, nickel hydrogen batteries, lithium ion batteries, lithium ion polymer batteries, and the like. These secondary batteries have been applied to and used for not only small products such as digital cameras, P-DVDs, MP3Ps, cellular phones, PDAs, portable game devices, power tools, and E-bikes, but also large products requiring high power such as electric vehicles and hybrid vehicles, and power storage devices or backup-power storage devices for storing surplus generated power and new renewable energy.

In order to manufacture an electrode assembly, a positive electrode (cathode), a separator, and a negative electrode (anode) are prepared and stacked. In particular, positive electrode active material slurry is applied to a positive electrode collector, and negative electrode active material slurry is applied to a negative electrode collector, whereby the positive electrode (cathode) and the negative electrode (anode) are manufactured. Also, when the separator is interposed and stacked between the manufactured positive electrode and negative electrode, a unit cell is formed. Then, unit cells are stacked on each other to form an electrode assembly. Subsequently, when the electrode assembly is accommodated in a specific case and an electrolyte is injected therein, a secondary battery is manufactured.

The secondary battery is classified into a pouch type, a can type, or the like according to a material of a case that accommodates the electrode assembly. In the pouch type, the electrode assembly is accommodated in a pouch made of a flexible polymer material having a variable shape. Also, in the can type, the electrode assembly is accommodated in a case made of a metal or plastic material or the like having a predetermined shape.

The pouch-type battery case is manufactured by forming a cup portion through a drawing process of a flexible pouch film. When the cup portion is formed, the electrode assembly is accommodated in an accommodation space of the cup portion, the battery case is folded, and then a sealing portion is sealed, whereby the secondary battery is manufactured.

Here, a gas may be generated from the inside of the secondary battery by an internal short circuit, overcharging, over-discharging, or the like. This gas increases the internal pressure of the secondary battery and thus causes problems such as weakening of a bonding force between components, damage of the case of the secondary battery, an early operation of a protection circuit, deformation of an electrode, an internal short circuit, explosion, and the like. In the can-type secondary battery, protection members such as a CID filter and a safety vent are provided. Thus, when the pressure within the case increases, electrical connection are physically interrupted. However, these protection members are not sufficiently provided in the pouch-type secondary battery according to the related art.

DISCLOSURE OF THE INVENTION

Technical Problem

An object to be achieved by the present invention is to provide a method for manufacturing an electrode lead, by which a two-stepped electrode lead is formed to discharge gas generated inside a battery case to the outside, thereby capable of ensuring safety, and by which the two-stepped electrode lead may be rapidly and easily manufactured; and a pressing device which is used in a process of manufacturing the two-stepped electrode lead.

The objects of the present invention are not limited to the above-mentioned object, and other objects that have not been mentioned above will become evident to those skilled in the art from the following description.

Technical Solution

To solve the above problem, a method for manufacturing an electrode lead according to an embodiment of the present invention includes: a step of manufacturing each of a first electrode lead and a second electrode lead by cutting a metal plate; a step of applying an adhesive to at least one of one end of the first electrode lead or the other end of the second electrode lead; a step of forming a lead stack by bonding the one end of the first electrode lead and the other end of the second electrode lead to each other; a step of placing the lead stack on a die; and a step of applying heat and pressure to a connection portion of the lead stack, in which the first electrode lead and the second electrode lead are connected to each other, by using a pressing device.

Also, the pressing device may include: an upper pressing device configured to press the lead stack from above; and a lower pressing device configured to press the lead stack from below.

Also, the upper pressing device may press the lead stack while moving vertically.

Also, the lower pressing device may press the lead stack while moving vertically.

Also, the lower pressing device may be fixed to the die.

Also, the pressing device may include a heating coil therein.

Also, in the step of applying the heat and pressure, the pressing device may apply the heat and pressure to the connection portion for 30 seconds to 3 minutes.

Also, the method may further include, prior to the step of cutting the metal plate, a step of preforming a surface treatment on the metal plate.

Also, the adhesive may be formed by mixing a conductive material and a polymer.

Also, the conductive material may include at least one of graphite, carbon black, a conductive fiber, metal powder, a conductive whisker, a conductive metal oxide, or a conductive raw material.

Also, the conductive material may include silver.

Also, the polymer may include at least one of an epoxy resin, an acrylic resin, an ethylene propylene diene monomer (EPDM) resin, a chlorinated polyethylene (CPE) resin, silicone, polyurethane, a urea resin, a melamine resin, a phenolic resin, an unsaturated ester resin, polypropylene, polyethylene, polyimide, or polyamide.

Also, the polymer may include the epoxy resin.

Also, the adhesive may include 70 to 80 wt % of the conductive material and 20 to 30 wt % of the polymer.

To solve the above problem, a pressing device according to an embodiment of the present invention includes: an upper pressing device configured to press, from above, a lead stack which is formed by bonding one end of a first electrode lead and the other end of a second electrode lead to each other; and a lower pressing device configured to press the lead stack from below, wherein heat and pressure are applied to a connection portion of the lead stack, in which the first electrode lead and the second electrode lead are connected to each other.

Also, the upper pressing device may press the lead stack while moving vertically.

Also, the lower pressing device may press the lead stack while moving vertically.

Also, the lower pressing device may be fixed to a die.

Also, the pressing device may include a heating coil therein.

Also, the heat and pressure may be applied to the connection portion for 30 seconds to 3 minutes.

Other specific features of the present invention are included in the detailed description and drawings.

Advantageous Effects

The embodiments of the present invention may have at least the following effects.

The plurality of electrode leads are provided to form the two-stepped electrode lead, and thus, the gas may be discharged to the outside to ensure the safety even when the gas is generated inside the battery case to increase the internal pressure.

Also, the separate pressing device is utilized without using a jig and an oven, and thus, the two-stepped electrode lead may be rapidly and easily manufactured.

The effects of the present invention are not limited by the aforementioned description, and thus, more varied effects are involved in this specification.

MODE FOR CARRYING OUT THE INVENTION

Figure 1:
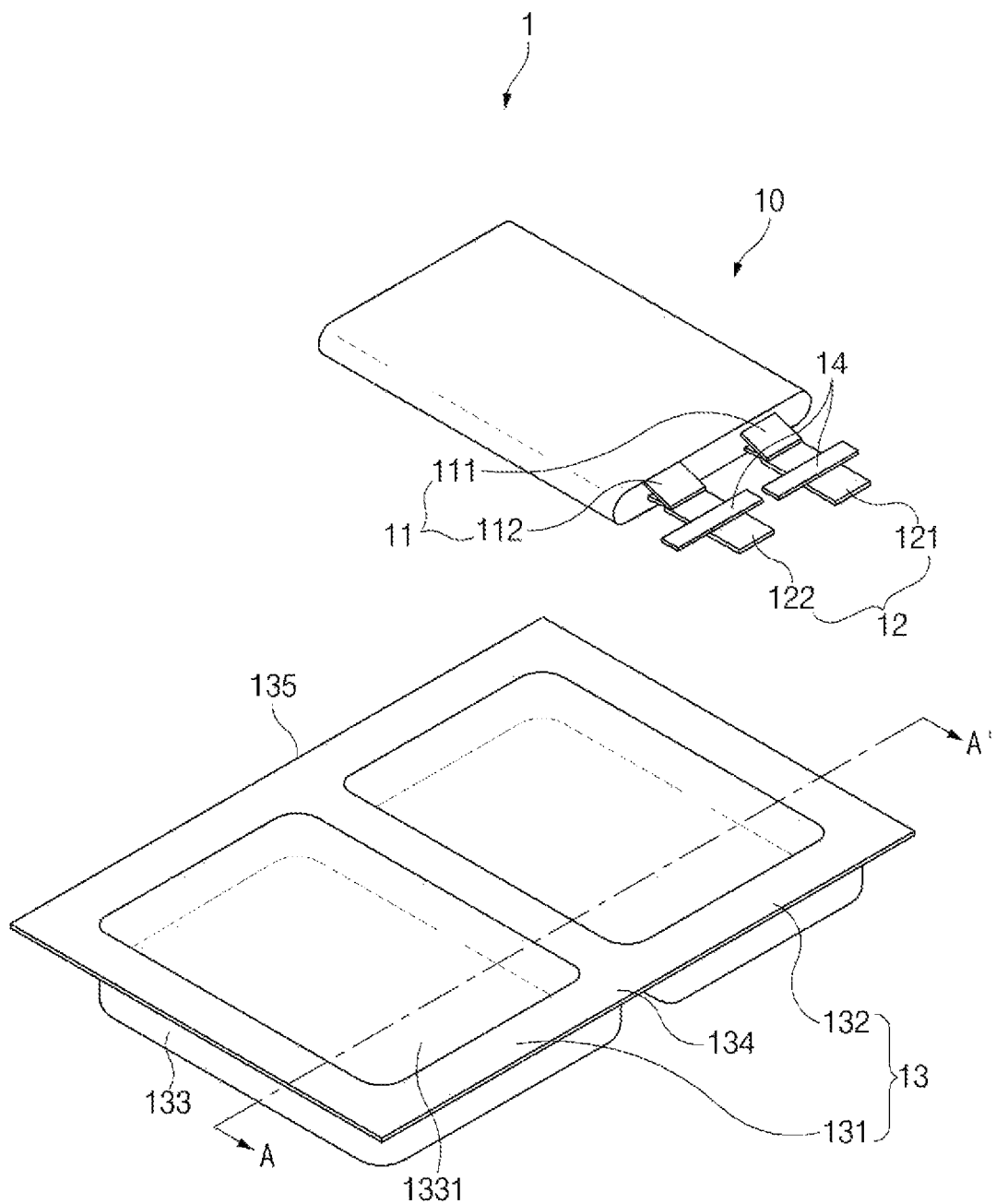
FIG. 1 is an assembly view of a pouch-type secondary battery according to an embodiment of the present invention.

Advantages and features of the present invention, and implementation methods thereof will be clarified through embodiments described in detail with reference to the accompanying drawings. The present invention may, however, be embodied in various different forms and should not be construed as limited to the embodiments set forth herein. Rather, these embodiments are provided so that this disclosure will be thorough and complete, and will fully convey the scope of the present invention to those skilled in the art. Further, the present invention is defined only by scopes of claims. Like reference numerals refer to like elements throughout.

Unless otherwise defined, all terms (including technical and scientific terms) used herein have the same meaning as commonly understood by one of ordinary skill in the art to which the present invention belongs. Also, terms as defined in a generally used dictionary are not construed ideally or excessively unless defined apparently and specifically.

The terms used in this specification are used only for explaining embodiments while not limiting the present invention. In this specification, the singular forms include the plural forms as well, unless the context clearly indicates otherwise. The meaning of "comprises" and/or "comprising" used in the specification does not exclude the presence or addition of one or more components other than the mentioned component.

Hereinafter, preferred embodiments of the present invention will be described in detail with reference to the accompanying drawings.

Figure 2:
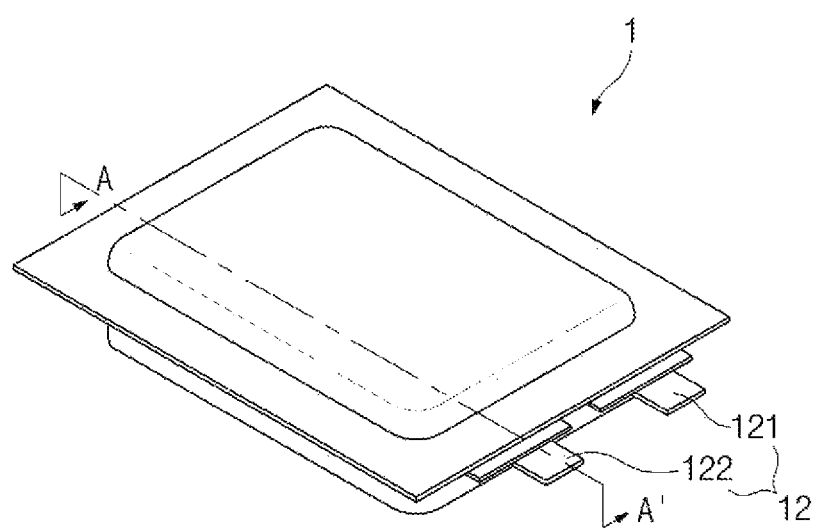
FIG. 2 is a perspective view of a pouch-type secondary battery according to an embodiment of the present invention.

FIG. 1 is an assembly view of a pouch-type secondary battery 1 according to an embodiment of the present invention, and FIG. 2 is a perspective view of a pouch-type secondary battery 1 according to an embodiment of the present invention.

As illustrated in FIG. 1, the pouch-type secondary battery 1 according to an embodiment of the present invention includes an electrode assembly 10, which is formed by stacking a separator and electrodes such as a positive electrode and a negative electrode, and a pouch-type battery case 13 which accommodates the electrode assembly 10 therein.

To manufacture the pouch-type secondary battery 1, slurry, in which an electrode active material, a binder, and a plasticizer are mixed, is applied first to a positive electrode collector and a negative electrode collector to manufacture electrodes such as a positive electrode and a negative electrode. Then, the electrodes are stacked on both sides of a separator to form the electrode assembly 10 having a predetermined shape. Subsequently, the electrode assembly 10 is inserted into the battery case 13, an electrolyte is injected therein, and then a sealing process is performed.

Particularly, the electrode assembly 10 may be a stack structure, which is provided with two types of electrodes such as the positive electrode and the negative electrode and the separator interposed between the electrodes or disposed on the left or right side of one of the electrodes to insulate the electrodes from each other. The stack structure may not be limited to that described above but have various shapes. A positive electrode and a negative electrode having predetermined specifications may be stacked with a separator therebetween or may be wound in a jelly roll shape. The two types of electrodes, that is, the positive electrode and the negative electrode have structures in which active material slurry is applied to electrode collectors having metal foil or metal mesh shapes including aluminum and copper, respectively. The slurry may be generally formed by mixing granular active materials, auxiliary conductors, binders, plasticizers, and so on in a state where a solvent is added. The solvent is removed during a subsequent process.

The electrode assembly 10 includes an electrode tab as illustrated in FIG. 1. The electrode tab 11 is connected to each of the positive electrode and the negative electrode of the electrode assembly 10, and protrudes outward from the electrode assembly 10, thereby providing a path through which electrons may move between the inside and the outside of the electrode assembly 10. Each of the electrode collectors of the electrode assembly 10 has a portion which is coated with the electrode active material and an end portion, that is, a non-coating portion which is not coated with the electrode active material. Also, the electrode tab 11 may be formed by cutting the non-coating portion or formed by connecting a separate conductive member to the non-coating portion through ultrasonic welding or the like. Although the electrode tabs 11 may protrude from one side of the electrode assembly 10 side by side in the same direction as illustrated in FIG. 1, but the embodiment is not limited thereto. The electrode tabs 11 may protrude in directions different from each other.

An electrode lead 12 is connected to the electrode tab 11 of the electrode assembly 10 through spot welding or the like. The electrode lead 12 according to an embodiment of the present invention is provided in plurality to form a two-stepped electrode lead 12. Also, in the two-stepped electrode lead 12, a first electrode lead 1201 (illustrated in FIG. 8) is connected to the electrode tab 11 of the electrode assembly 10, and a second electrode lead 1202 (illustrated in FIG. 8) protrudes to the outside of the battery case 13. The two-stepped electrode lead 12 will be described in detail later.

A portion of the electrode lead 12 is surrounded by an insulating part 14. The insulating part 14 is disposed to be limited within a sealing part 134, at which an upper case 131 and a lower case 132 of the battery case 13 are thermally fused, so that the electrode lead 12 is bonded to the battery case 13. Accordingly, electricity generated from the electrode assembly 10 is prevented from flowing to the battery case 13 through the electrode lead 12, and the sealing of the battery case 13 is maintained. Thus, the insulating part 14 is made of a non-conductor having non-conductivity in which the electricity does not flow well. Generally, although relatively thin insulating tape easily attached to the electrode lead 12 is widely used as the insulating part 14, the embodiment is not limited thereto. Various members may be used as long as the members are capable of insulating the electrode lead 12.

The electrode lead 12 includes a positive electrode lead 121 which has one end connected to a positive electrode tab 111 and extends in a direction in which the positive electrode tab 111 protrudes, and a negative electrode lead 122 which has one end connected to a negative electrode tab 112 and extends in a direction in which the negative electrode tab 112 protrudes. Here, the other end of each of the positive electrode lead 121 and the negative electrode lead 122 protrudes outward from the battery case 13 as illustrated in FIG. 1. Accordingly, the electricity generated inside the electrode assembly 10 may be supplied to the outside. Also, since the positive electrode tab 111 and the negative electrode tab 112 protrude in various directions, the positive electrode lead 121 and the negative electrode lead 122 may also extend in various directions.

The positive electrode lead 121 and the negative electrode lead 122 may be made of materials different from each other. That is, the positive electrode lead 121 may have the same aluminum (Al) material as the positive electrode collector, and the negative electrode lead 122 may have the same copper (Cu) material or nickel (Ni)-coated copper material as the negative electrode collector. Also, a portion of the electrode lead 12 protruding outward from the battery case 13 serves as a terminal part and is electrically connected to an external terminal.

The battery case 13 is a pouch which is made of a flexible material and accommodates the electrode assembly 10 therein. Hereinafter, the battery case 13 will be described as being the pouch. When a flexible pouch film 135 is drawn by using a punch or the like, a portion thereof is stretched to form a cup portion 133 that includes an accommodation space 1331 having a bag shape, whereby the battery case 13 is manufactured. The battery case 13 is sealed after the electrode assembly 10 is accommodated therein such that a portion of the electrode lead 12, i.e., the terminal part is exposed. The battery case 13 includes the upper case 131 and the lower case 132 as illustrated in FIG. 1. The lower case 132 has a cup portion 133 to provide an accommodation space 1331 in which the electrode assembly 10 may be accommodated, and the upper case 131 covers the accommodation space 1331 from above so that the electrode assembly 10 is not moved to the outside of the battery case 13. Then, the sealing part 134 is sealed, and thus, the accommodation space 1331 is closed. Here, the upper case 131 also has a cup portion 133 in which an accommodation space 1331 is provided, and thus, the electrode assembly 10 may be accommodated in an upper portion. Although the upper case 131 and the lower case 132 may be manufactured such that the respective sides thereof are connected to each other as illustrated in FIG. 1, the embodiment is not limited thereto. These cases may be diversely manufactured, for example, individually manufactured and separated from each other.

When the electrode lead 12 is connected to the electrode tab 11 of the electrode assembly 10 and the insulating part 14 is provided on a portion of the electrode lead 12, the electrode assembly 10 is accommodated in the accommodation space 1331 provided in the cup portion 133 of the lower case 132, and the upper case 131 covers the space from above. Then, the electrolyte is injected to the inside, and the sealing part 134 provided on the edges of the upper case 131 and the lower case 132 is sealed. The electrolyte is allowed to move lithium ions generated by an electrochemical reaction of the electrode during charging and discharging of the secondary battery 1, and may include a non-aqueous organic electrolyte, which is a mixture of a lithium salt and a high-purity organic solvent, or may include a polymer using a polymer electrolyte. Through the method described above, the pouch-type secondary battery 1 may be manufactured as illustrated in FIG. 2.

Figure 3:
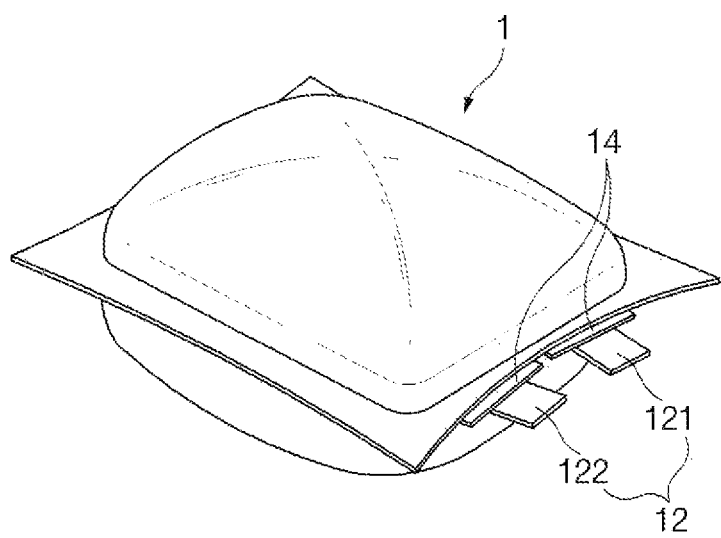
FIG. 3 is a perspective view showing a state in which a pouch-type secondary battery according to an embodiment of the present invention expands in volume.

FIG. 3 is a perspective view showing a state in which the pouch-type secondary battery 1 according to an embodiment of the present invention expands in volume.

Generally, an abnormally large amount of gas may be generated in the pouch-type secondary battery 1 due to heat generation from an internal short circuit by external impact to the electrode assembly 10, overcharging, over-discharging, or the like, and electrolyte decomposition or thermal runaway phenomenon caused by the heat generation. In addition, when kept or stored at a high temperature, an electrochemical reaction between an electrolyte and an electrode active material may be quickly accelerated by the high temperature to thereby generate a gas.

Here, to manufacture the pouch-type battery case 13, the flexible pouch film 135 is drawn by using a punch or the like, and thus, the cup portion 133 is recessed in the lower case 132. This drawing process is performed by inserting the pouch film 135 into a press and pressing the pouch film 135 using the punch, whereby the pouch film 135 is stretched. As described above, the battery case 13 is manufactured by stretching the pouch film 135 and forming the cup portion 133. The pouch film 135 may be formed by stacking a surface protection layer mainly made of polymers such as a nylon resin or polyethylene terephthalate (PET), a gas barrier layer mainly made of an aluminum foil, and a sealant layer mainly made of polymers such as polypropylene (PP) or polyethylene (PE).

When pressure is increased due to the gas generated inside the battery case 13, the secondary battery 1 expands in volume as illustrated in FIG. 3 because the battery case 13 is flexible. Also, problems occur such as weakening of a bonding force between components, damage to the case of the secondary battery 1, an early operation of a protection circuit, deformation of an electrode, an internal short circuit, explosion, and the like.

Thus, according to the present invention, the electrode lead 12 is provided in plurality to form a two-stepped electrode lead 12. Also, when the secondary battery expands in volume, the two-stepped electrode lead 12 is disconnected, and thus, electrical connection is physically interrupted. To manufacture the two-stepped electrode lead 12, an adhesive 151 is applied first to at least one of one end of a first electrode lead 1201 or the other end of a second electrode lead 1202. Then, after a lead stack 120 is formed by bonding the one end of the first electrode lead 1201 and the other end of the second electrode lead 1202 to each other, heat is applied thereto. Thus, as the adhesive 151 is cured to form a bonding part 15 (illustrated in FIG. 8), the manufacturing of the two-stepped electrode lead 12 is completed.

However, according to the related art, the lead stack 120, in which the first electrode lead 1201 and the second electrode lead 1202 are bonded to each other, was inserted and fixed to a jig and then input into an oven. Thus, since only heat is applied while pressure is not applied separately, a significantly long period of time, two or more hours, was consumed to cure the adhesive 151.

Then, lead stacks 120 were inserted one by one into jigs, and the plurality of jigs were arranged on a plate and then input into the oven. Thus, the process was complicated.

Figure 4:
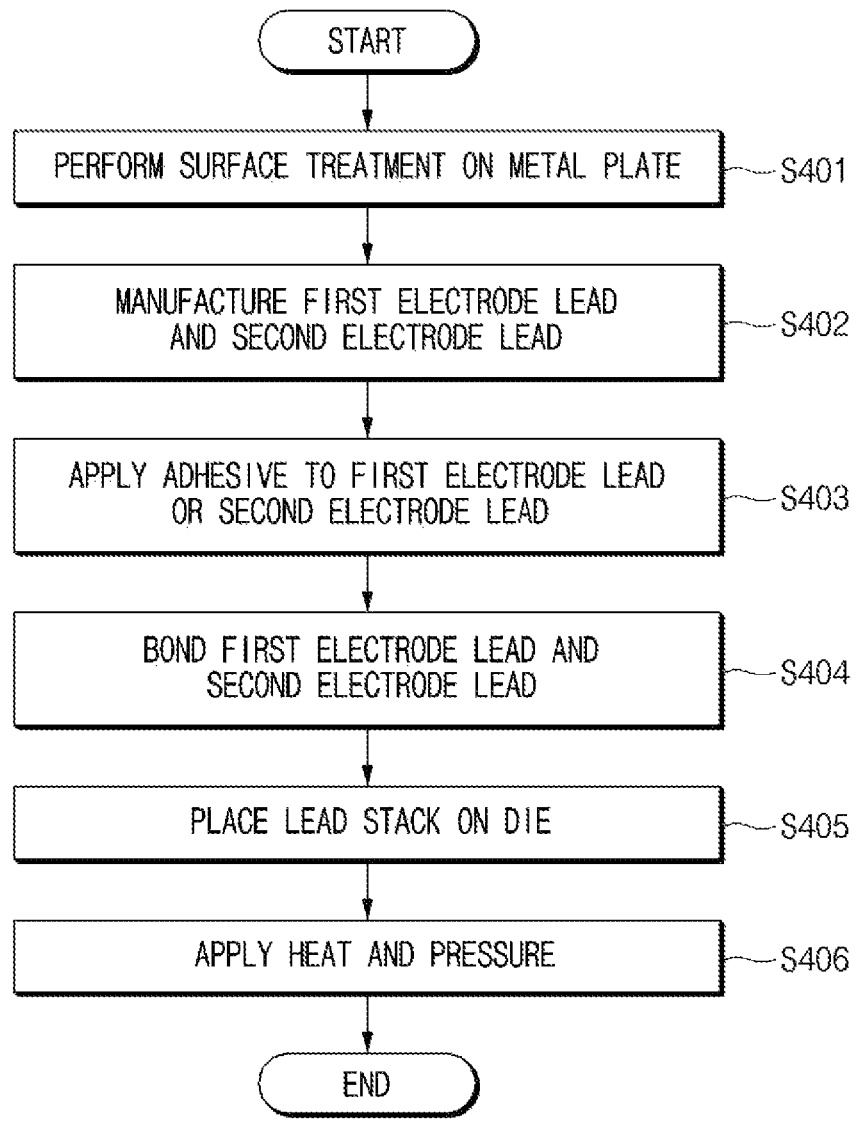
FIG. 4 is a flowchart showing a method for manufacturing an electrode lead according to an embodiment of the present invention.

FIG. 4 is a flowchart showing a method for manufacturing an electrode lead 12 according to an embodiment of the present invention.

According to an embodiment of the present invention, a plurality of electrode leads 12 are provided to form a two-stepped electrode lead 12, and thus, a gas may be discharged to the outside to ensure the safety even when the gas is generated inside the battery case 13 to increase internal pressure. Also, a separate pressing device 2 (illustrated in FIG. 6) is utilized without using the jig and oven, and thus, the two-stepped electrode lead 12 may be rapidly and easily manufactured.

For this, in a method for manufacturing an electrode lead 12 according to an embodiment of the present invention, the method for manufacturing the electrode lead 12 included in the secondary battery 1 includes: a step of manufacturing each of a first electrode lead 1201 and a second electrode lead 1202 by cutting a metal plate; a step of applying an adhesive 151 to at least one of one end of the first electrode lead 1201 or the other end of the second electrode lead 1202; a step of forming a lead stack 120 by bonding the one end of the first electrode lead 1201 and the other end of the second electrode lead 1202 to each other; a step of placing the lead stack 120 on a die; and a step of applying heat and pressure to a connection portion 16 of the lead stack 120, in which the first electrode lead 1201 and the second electrode lead 1202 are connected to each other, by using a pressing device 2.

Hereinafter, each step illustrated in the flowchart of FIG. 4 will be described in detail with reference to FIGS. 5 to 7.

Figure 5:
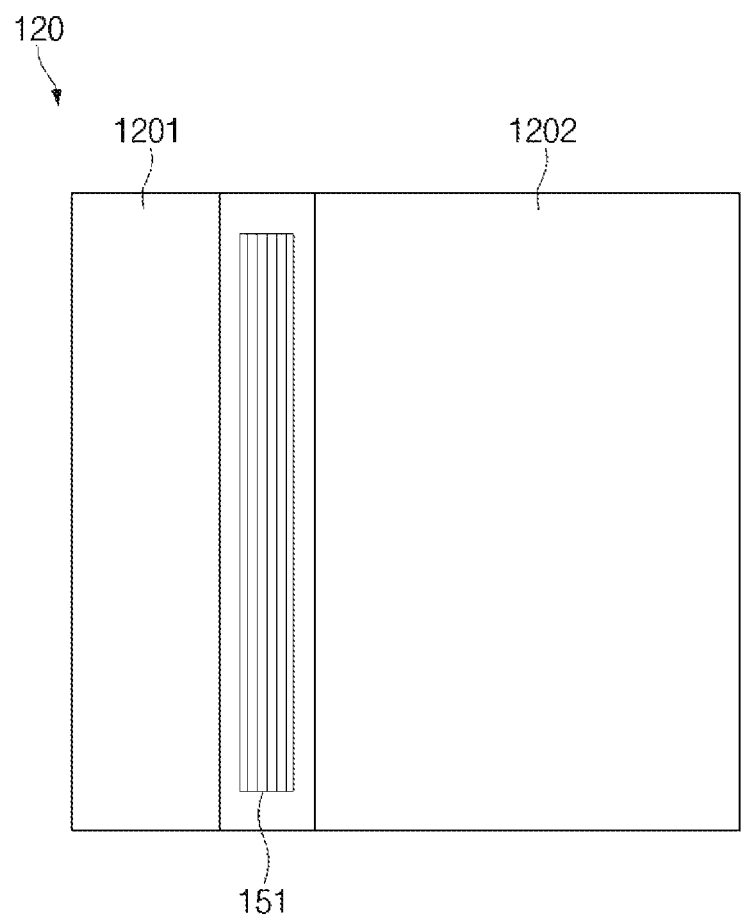
FIG. 5 is a schematic view showing a state in which one end of a first electrode lead and the other end of a second electrode lead are bonded to each other according to an embodiment of the present invention.

FIG. 5 is a schematic view showing a state in which the one end of the first electrode lead 1201 and the other end of the second electrode lead 1202 are bonded to each other according to an embodiment of the present invention.

First, surface treatments such as plating, oxidization, and thin film treatment are performed on the metal plate (S401). When the electrode lead 12 is assumed to be the positive electrode lead 121, the metal plate may have the same aluminum (Al) material as the positive electrode collector as described above. Also, when the electrode lead is assumed to be the negative electrode lead 122, the metal plate may have the same copper (Cu) material as the negative electrode collector. A plating process is performed on the metal plate with a metal such as nickel (Ni). The plating process may be performed by, but not limited to, various methods such as electroplating and electroless plating.

When the plating process is completed, the surface treatment is performed to prevent the metal plate from being oxidized and improve an adhesion force to the insulating part 14. The surface treatment may include a chromate treatment using chromium. The chromate treatment is one type of chemical conversion coatings, and an insoluble chromate (chromic acid salt) film having chromium components is thinly formed on the surface of metal. For this, the metal plate is immersed in an aqueous solution containing chromium ions. Thus, the chromium ions are oxidized, and the insoluble chromium oxide is formed on the outer surface of the metal plate, whereby a chromate film is formed. Here, the chromium ions may include, but not limited to, various types of ions such as $Cr^{6+}$ ions or $Cr^{3+}$ ions. Also, the aqueous solution containing the chromium ions may include, but not limited to, various materials such as chromic anhydride, chromium nitrate, chromium sulfate, chromium acetate, and chromium chloride.

Also, the surface treatment may be a non-chromate treatment in which materials except for chromium are used. Here, the materials except for chromium may be, for example, zirconium. If a zirconia treatment using zirconium is performed, the metal plate is immersed in an aqueous solution containing zirconium ions. Thus, the zirconium ions are oxidized, and the zirconium oxide is formed on the outer surface of the metal plate, whereby a zirconia film is formed.

The non-chromate may be not limited thereto and include a titanium treatment using titanium or the like. That is, the surface treatment for the metal plate may be not limited to those described above, but include various methods.

After the surface treatment for the metal plate is completed, the metal plate is cut to manufacture each of the first electrode lead 1201 and the second electrode lead 1202 (S402). It is desirable that all of the first electrode lead 1201 and the second electrode lead 1202 have a quadrangular shape. Also, it is desirable that the widths thereof are equal to each other for easy bonding, which will be described later.

When the metal plate is cut, a press device may be used, or laser may be used. That is, to manufacture the first electrode lead 1201 and the second electrode lead 1202, the cutting of the metal plate is not limited thereto and may be performed through various methods.

The adhesive 151 is applied to at least one of the one end of the manufactured first electrode lead 1201 and the other end of the manufactured second electrode lead 1202 (S403). Then, the lead stack 120 is formed by bonding the one end of the first electrode lead 1201 and the other end of the second electrode lead 1202 to each other (S404).

The adhesive 151 includes a conductive material. Accordingly, electricity generated from the electrode assembly 10 may be easily discharged to the outside. For this, it is desirable that the adhesive 151 is formed by mixing a conductive material and a polymer.

The conductive material includes at least one of: natural or artificial graphite; carbon black such as carbon black, acetylene black, Ketjen black, channel black, furnace black, lamp black, and thermal black; a conductive fiber such as a carbon fiber or a metal fiber; metal powder such as fluorocarbon, aluminum, nickel, gold, silver, copper powder; powder having a core/shell structure in which one type of metal is coated with a different type of metal; a conductive whisker such as a zinc oxide and potassium titanate; a conductive metal oxide such as a titanium oxide; or a conductive raw material such as a polyphenylene derivative. Particularly, it is most desirable that the silver is contained. It is desirable that 70 to 80 wt % of the conductive material is contained in the adhesive 151.

The polymer includes at least one of thermosetting polymer resins such as an epoxy resin, an acrylic resin, an ethylene propylene diene monomer (EPDM) resin, a chlorinated polyethylene (CPE) resin, silicone, polyurethane, a urea resin, a melamine resin, a phenolic resin, an unsaturated ester resin, polypropylene, polyethylene, polyimide, or polyamide. Particularly, it is most desirable that the epoxy or the acrylic resin is contained. It is desirable that 20 to 30 wt % of the polymer is contained in the adhesive 151.

Figure 6:
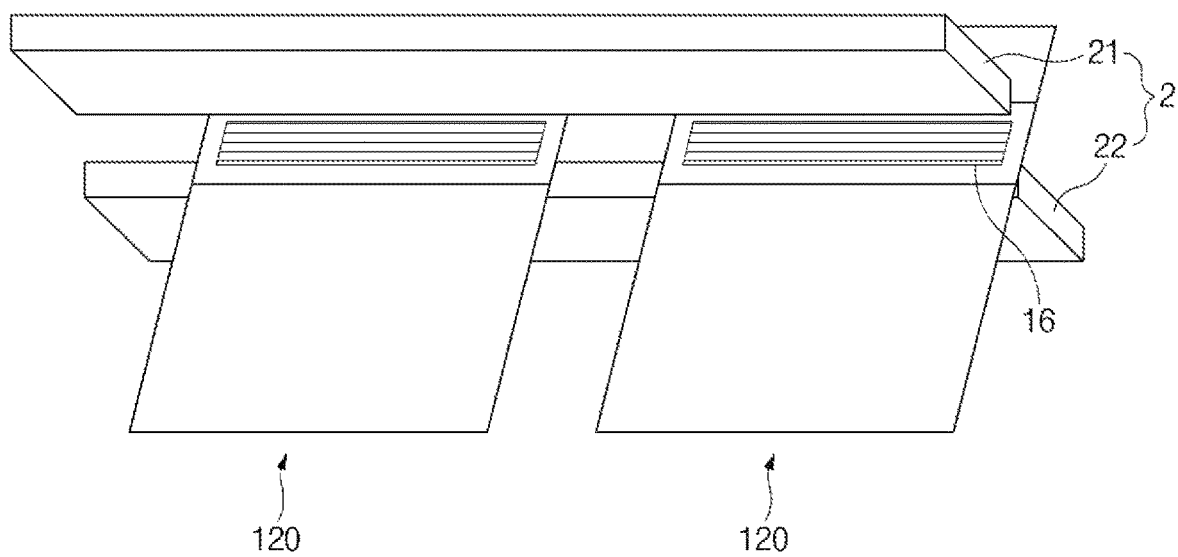
FIG. 6 is a schematic view showing a state in which a connection portion between a first electrode lead and a second electrode lead is pressed by a pressing device according to an embodiment of the present invention.

FIG. 6 is a schematic view showing a state in which the connection portion 16 between the first electrode lead 1201 and the second electrode lead 1202 is pressed by the pressing device 2 according to an embodiment of the present invention.

The lead stack 120 formed as described above is placed on a die (not shown) (S405). Then, by using the pressing device 2, heat and pressure are applied to the connection portion 16 of the lead stack 120, in which the first electrode lead 1201 and the second electrode lead 1202 are connected to each other (S406). Accordingly, as the adhesive 151 is cured, the two-stepped electrode lead 12 may be manufactured.

As illustrated in FIG. 6, the pressing device 2 according to an embodiment of the present invention includes an upper pressing device 21 that presses the lead stack 120 from above and a lower pressing device 22 that presses the lead stack 120 from below. Also, each of the upper pressing device 21 and the lower pressing device 22 may move vertically. Thus, when the lead stack 120 is placed on the die, the upper pressing device 21 is disposed above the lead stack 120, and the lower pressing device 22 is disposed below. Then, the upper pressing device 21 moves downward, and the lower pressing device 22 moves upward. Accordingly, the upper pressing device 21 and the lower pressing device 22 respectively press, from above and from below, the first electrode lead 1201 and the second electrode lead 1202.

Here, it is desirable that the first electrode lead 1201 and the second electrode lead 1202 are connected to each other while being positioned in different planes so that top and bottom surfaces are bonded to each other, rather than while being positioned in the same plane so that side surfaces are connected. Accordingly, the adhesion force between the first electrode lead 1201 and the second electrode lead 1202 may be enhanced. Thus, when the manufacturing of the two-stepped electrode lead 12 is completed, a stepped portion may be formed in the connection portion 16 in which the first electrode lead 1201 and the second electrode lead 1202 are connected.

Thus, it is desirable that the die has a shape corresponding to the stepped portion that is formed in the connection portion 16 between the first electrode lead 1201 and the second electrode lead 1202. That is, it is desirable that a stepped portion is also formed in the die. Accordingly, when is placed on the die, the lead stack 120 may be stably placed without moving even with a small external force.

Also, the lead stack 120 is placed on the top surface of the die. Thus, a moving path (not shown) for the lower pressing device 22 may be formed by perforating the die so that the lower pressing device 22 easily presses the lead stack 120 from below while moving up and down.

The pressure applied to the connection portion 16 by the pressing device 2 may be adjusted. When the pressure of the pressing device 2 increases, a time for curing the adhesive 151 decrease, and a process time is reduced. However, the lead stack 120 may be damaged, or the adhesive 151 may be scattered to the outside, thereby causing deterioration in quality of the electrode lead 12. On the contrary, when the pressure of the pressing device 2 decreases, the time for curing the adhesive 151 may increase, thereby increasing the process time. Thus, the process time and the quality of the electrode lead 12 may be controlled by adjusting the pressure of the pressing device 2.

A heating coil (not shown) may be provided inside the pressing device 2. That is, the heating coil (not shown) may be provided inside at least one of the upper pressing device or the lower pressing device 22. Thus, when the upper pressing device 21 and the lower pressing device 22 press the first electrode lead 1201 and the second electrode lead 1202, the electricity flows through the heating coil, and thus, the heat may be applied thereto together. Also, as current of electricity flowing through the heating coil is easily adjusted by a user, the temperature of the heating coil may be easily modified. The temperature when the pressing device 2 applies the heat may be 150° to 220°, preferably, 180° to 200°.

According to another embodiment of the present invention, only the upper pressing device 21 of the pressing device 2 may move vertically, and the lower pressing device 22 may be fixed to the die. Also, the lower pressing device 22 may be formed as a portion of the die, and support the lead stack 120 from below when the lead stack 120 is placed on the die. Also, only the upper pressing device 21 moves downward, and thus, the lead stack 120 may be pressed from above. Here, since the lower pressing device 22 is fixed to the die, a moving path for the lower pressing device 22 may not be formed in the die.

As described above, the lead stack 120 is not inserted into a jig but merely placed on the die. Also, the heat and pressure are applied together by using the separate pressing device 2 without inputting the first electrode lead 1201 and the second electrode lead 1202 into an oven and heating same. Thus, the process may not be inconvenient.

Also, in the related art in which only the heat is applied, it takes a significantly long period of time, i.e., two or more hours to cure the adhesive 151. However, according to an embodiment of the present invention, the adhesive 151 may be cured within a short period of time, i.e., several minutes because not only the heat but also the pressure are applied together. For example, the heat and pressure may be applied to the connection portion 16, in which the first electrode lead 1201 and the second electrode lead 1202 are connected to each other, by the pressing device 2 for 30 seconds to 3 minutes. In particular, the heat and pressure may be preferably applied for 1 minute to 2 minutes. Accordingly, as the adhesive 151 is cured, the manufacturing of the two-stepped electrode lead 12 may be completed.

Furthermore, by adjusting a length of the pressing device 2, the heat and pressure may be applied to several lead stacks 120 with only one pressing device 2. Accordingly, the process time for manufacturing the electrode lead 12 may be further shortened, and thus, production may increase.

Figure 7:
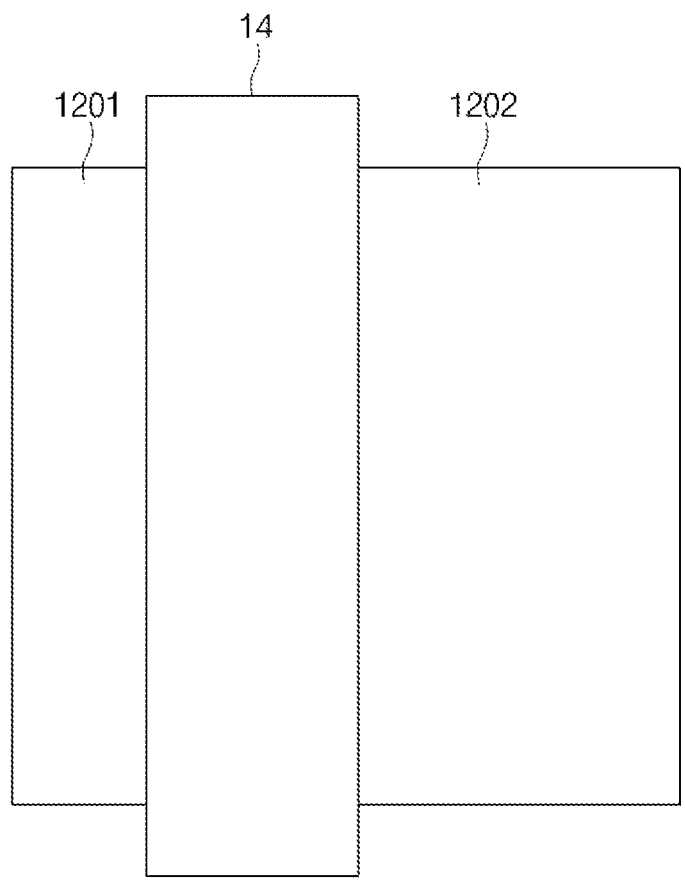
FIG. 7 is a schematic view showing a state in which an insulating part is attached to an electrode lead according to an embodiment of the present invention.

FIG. 7 is a schematic view showing a state in which an insulating part is attached to the electrode lead 12 according to an embodiment of the present invention.

During a process of sealing the upper case 131 and the lower case 132, relatively high pressure may be applied to a portion contacting the electrode lead 12, and thus, it is highly likely to damage the sealant layer of the battery case 13. The sealant layer directly contacts the electrode assembly 10 as described above and thus has insulating properties. However, if the sealant layer is damaged, the electricity may flow to the battery case 13 through the electrode lead 12. Particularly, since the gas barrier layer of the battery case 13 is made of a metal such as aluminum, even when the sealant layer is slightly damaged to expose the gas barrier layer, the electricity may easily flow due to the contact with the electrode lead 12.

Thus, as described above, a portion of the electrode lead 12 is surrounded by the insulating part 14. The insulating part 14 is made of a non-conductor having non-conductivity in which the electricity does not flow well. Also, the insulation part 14 has high mechanical strength and heat resistance. Thus, when the upper case 131 and the lower case 132 are thermally fused, the insulation part 14 is maintained in shape to prevent the electrode lead 12 and the gas barrier layer from contacting each other even when the sealant layer is partially damaged to expose the gas barrier layer. Accordingly, the electricity generated from the electrode assembly 10 is prevented from flowing to the battery case 13 through the electrode lead 12.

Thus, the insulating part 14 is disposed to be limited within the sealing part 134, at which the upper case 131 and the lower case 132 of the battery case 13 are thermally fused, so that the electrode lead 12 is bonded to the battery case 13. The insulating portion 14 may be made of at least one of a thermoplastic resin, a thermosetting resin, or a photocurable resin having electrical insulating properties as a polymer resin. Generally, although relatively thin insulating tape easily attached to the electrode lead 12 is widely used as the insulating part 14, the embodiment is not limited thereto. Various members may be used as long as the members are capable of insulating the electrode lead 12.

As illustrated in FIG. 7, the insulating part 14 surrounds the connection portion 16 in which the first electrode lead 1201 and the second electrode lead 1202 are connected to each other. If the connection portion 16 is not surrounded by the insulating part, the sealing part 134 may not apply repulsive force to the first electrode lead 1201 and the second electrode lead 1202 even though the battery case 13 expands. The repulsive force will be described in detail later.

Figure 8:
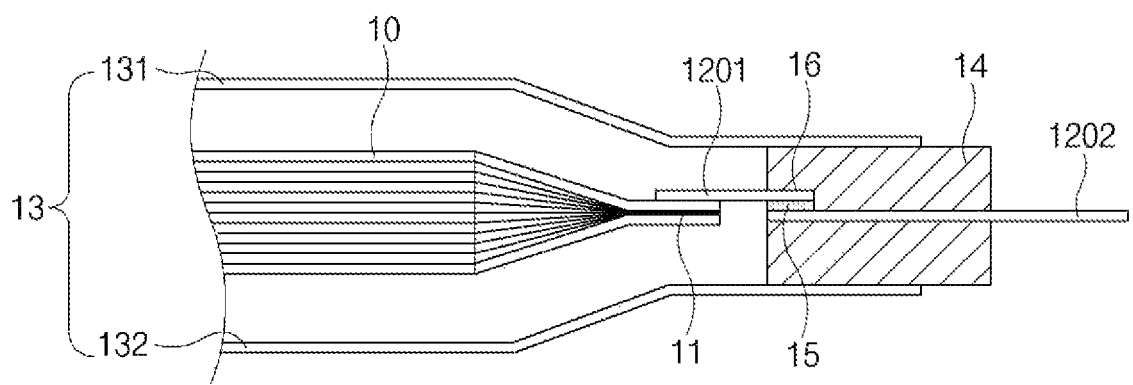
FIG. 8 is a portion of a cross-sectional view of a pouch-type secondary battery according to an embodiment of the present invention, taken along line A-A' of FIG. 2.

FIG. 8 is a portion of a cross-sectional view of a pouch-type secondary battery 1 according to an embodiment of the present invention, taken along line A-A' of FIG. 2.

In the pouch-type secondary battery 1 according to an embodiment of the present invention, the embodiment 12 is formed in two steps as illustrated in FIG. 8. That is, the electrode lead 12 includes the first electrode lead 1201 connected to the electrode tab 11 of the electrode assembly and the second electrode lead 1202 protruding to the outside of the battery case 13. Also, the first electrode lead 1201 and the second electrode lead 1202 are connected to each other as surfaces thereof are bonded to each other through a bonding part 15. The bonding part 15 is formed by curing the adhesive 151.

It is desirable that the bonding part 15, which connects the first electrode lead 1201 and the second electrode lead 1202 to each other, is very thin with a thickness of 1 to 500 um. Thus, although a stepped portion is formed by the first electrode lead 1201 and the second electrode lead 1202, a size of the stepped portion may not be excessively large.

Figure 9:
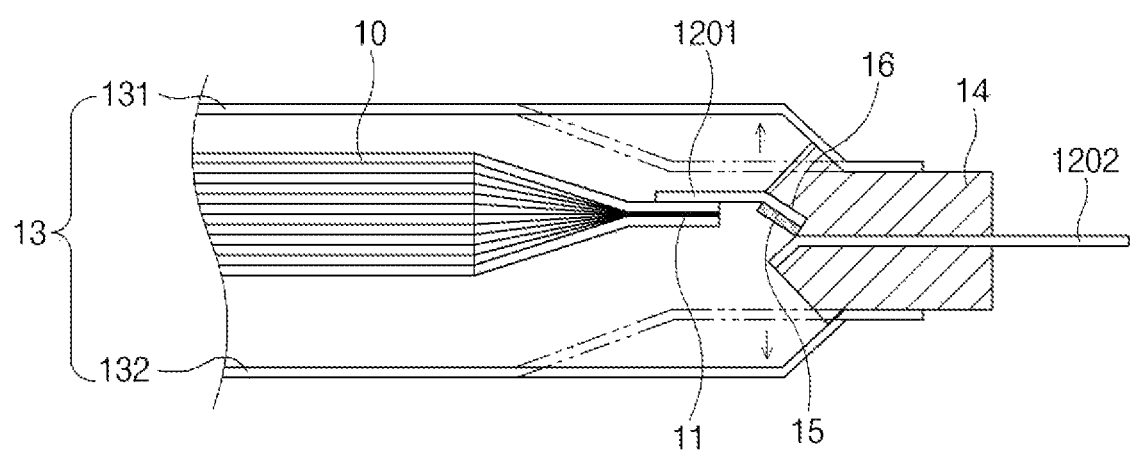
FIG. 9 is a portion of a cross-sectional view of a state in which a pouch-type secondary battery according to an embodiment of the present invention expands in volume, taken along line A-A' of FIG. 2.

FIG. 9 is a portion of a cross-sectional view of a state in which the pouch-type secondary battery 1 according to an embodiment of the present invention expands in volume, taken along line A-A' of FIG. 2.

As described above, when pressure increases inside the pouch-type battery case 13, the pouch-type secondary battery 1 expands in volume. Thus, as illustrated in FIG. 9, outer walls of the battery case 13 move toward the outside. Here, an upper wall and a lower wall among outer walls of the battery case 13 are more flexible because of having large areas and not being sealed. Thus, the upper wall of the battery case 13 moves upward, and the lower wall moves downward.

When the secondary battery 1 expands in volume, the outer walls of the battery case 13 move outward as illustrated in FIG. 9, and apply, through the insulating part 14, the repulsive force to the first electrode lead 1201 and the second electrode lead 1202 which are connected. Accordingly, when the internal pressure of the battery case 13 increases gradually, the moving force of the outer walls of the battery case 13 further increases, and the repulsive force applied to the first electrode lead 1201 and the second electrode lead 1202 further increases.

When the repulsive force is greater than the adhesion force between the first electrode lead 1201 and the second electrode lead 1202, the first electrode lead 1201 and the second electrode lead 1202 are eventually detached (separated) from each other as illustrated in FIG. 9. Thus, the electrical connection is interrupted, and thus, the electricity may no longer flow. However, herein, the adhesion force between the first and second electrode leads 1201 and 1202 and the bonding part 15 is less than the adhesion force between the first and second electrode leads 1201 and 1202 and the insulating part 14. Thus, when the repulsive force is applied to the first electrode lead 1201 and the second electrode lead 1202, because the adhesion force between the first and second electrode leads 1201 and 1202 and the insulation part 14 is maintained, the sealing of the battery case 13 is maintained, and the first and second electrode leads 1201 and 1202 are detached from each other.

Those with ordinary skill in the technical field to which the present invention pertains will understand that the present invention may be implemented in other specific forms without changing the technical idea or essential features. Thus, the above-described embodiments are to be considered illustrative and not restrictive to all aspects. The scope of the present invention is defined by the appended claims rather than the foregoing detailed description, and various modifications derived from the meaning and scope of the claims and the equivalent concept thereof should be interpreted as being included in the scope of the present invention.

The invention claimed is:

1. A method for manufacturing an electrode lead which is comprised in a secondary battery, the method comprising:
   manufacturing each of a first electrode lead and a second electrode lead by cutting a metal plate;
   applying an adhesive to at least one of an end of the first electrode lead or an end of the second electrode lead, the adhesive being electrically conductive and comprising an electrically conductive material;
   forming a lead stack by bonding the end of the first electrode lead and the end of the second electrode lead to each other;
   placing the lead stack on a die; and
   applying heat at a temperature of 150° to 220° and pressure to a connection portion of the lead stack for 30 seconds to 3 minutes, thereby mechanically and electrically connecting the first electrode lead and the second electrode lead to each other through the adhesive, by using a pressing device, such that the adhesive becomes cured and provides a mechanical and electrical connection between the first electrode lead and the second electrode lead.

2. The method of claim 1, wherein the pressing device comprises:
   an upper pressing device that presses the lead stack from a first side of the connection portion; and
   a lower pressing device that presses the lead stack from a second side of the connection portion opposite from the first side.

3. The method of claim 2, wherein the upper pressing device presses the lead stack while moving vertically towards the first side of connection portion.

4. The method of claim 3, wherein the lower pressing device presses the lead stack while moving vertically towards the second side of the connection portion.

5. The method of claim 3, wherein the lower pressing device is fixed to the die.

6. The method of claim 1, wherein the pressing device comprises a heating coil therein.

7. The method of claim 1, wherein, during the applying of the heat and pressure, the pressing device applies the heat and pressure to the connection portion for 30 seconds to 3 minutes.

8. The method of claim 1, further comprising, prior to the cutting of the metal plate, preforming a surface treatment on the metal plate.

9. The method of claim 1, wherein the adhesive is formed by mixing a conductive material and a polymer.

10. The method of claim 9, wherein the conductive material comprises at least one of: graphite, carbon black, a conductive fiber, metal powder, a conductive whisker, a conductive metal oxide, or a conductive raw material.

11. The method of claim 10, wherein the conductive material comprises silver.

12. The method of claim 9, wherein the polymer comprises at least one of: an epoxy resin, an acrylic resin, an ethylene propylene diene monomer (EPDM) resin, a chlorinated polyethylene (CPE) resin, silicone, polyurethane, a urea resin, a melamine resin, a phenolic resin, an unsaturated ester resin, polypropylene, polyethylene, polyimide, or polyamide.

13. The method of claim 12, wherein the polymer comprises the epoxy resin.

14. The method of claim 9, wherein the adhesive comprises 70 to 80 wt % of the conductive material and 20 to 30 wt % of the polymer.

* * * * *